United States Patent [19]

Potter

[11] 4,044,491
[45] Aug. 30, 1977

[54] FISH LURE

[76] Inventor: John Thomas Potter, 152 Fernbank Road, Box 565, Stittsville, Ontario, Canada, K0A 3G0

[21] Appl. No.: 700,858

[22] Filed: June 29, 1976

[30] Foreign Application Priority Data

June 18, 1976 Canada .................................. 255280

[51] Int. Cl.² ............................................. A01K 85/00
[52] U.S. Cl. .................. 43/42.22; 43/42.28; 43/42.36; 43/42.39; 43/42.49
[58] Field of Search ................ 43/42.28, 42.36, 42.39, 43/42.47, 42.49, 42.22

[56] References Cited

U.S. PATENT DOCUMENTS

| 1,727,936 | 9/1929 | Pflueger | 43/42.39 X |
| 1,931,932 | 10/1933 | Myers et al. | 43/42.36 X |
| 2,243,663 | 5/1941 | Wareham | 43/42.36 X |
| 2,559,542 | 7/1951 | Mintner | 43/42.22 |
| 3,500,576 | 3/1970 | Ostrom | 43/42.39 X |

Primary Examiner—Louis G. Mancene
Assistant Examiner—Daniel J. Leach
Attorney, Agent, or Firm—Gipple & Hale

[57] ABSTRACT

A fish lure comprises a hook suspended from a buoyant body, and a lip projecting from the body for causing lateral to and fro movement of the fish lure as the latter moves through water. A triangular wire projection extending from the body has a first portion extending outwardly from the body past the lip, a second portion extending laterally from the first portion opposite from the lip, and a third portion extending from the body to the second portion. A weight is selectively attachable and releasable from either of the first and second portions. The weight causes the body to be tilted when attached to the first portion and to be inverted when attached to the second portion.

11 Claims, 4 Drawing Figures

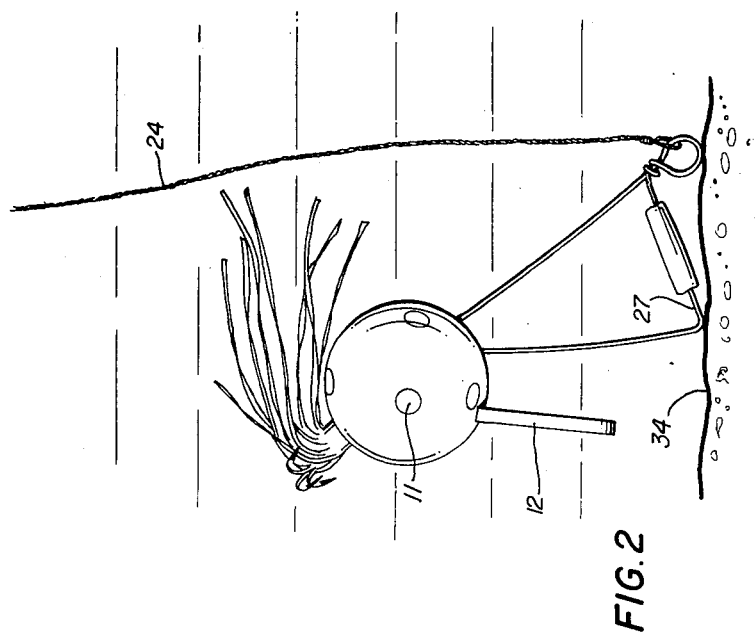
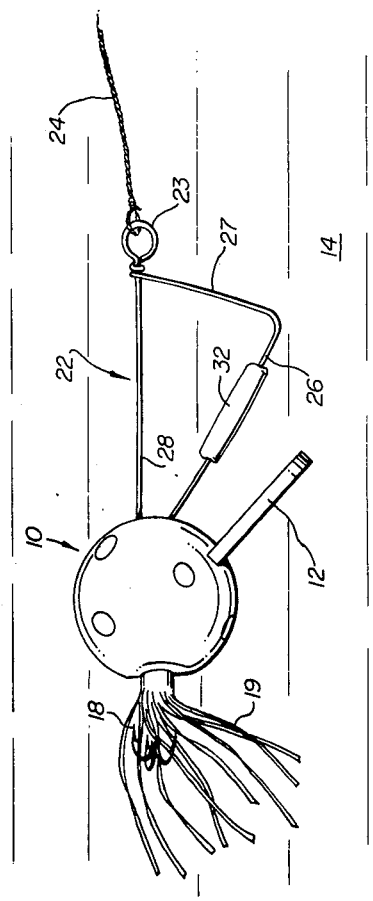

FISH LURE

FIELD OF THE INVENTION

The present invention relates to fish lures and, more particularly to fish lure of the type comprising a hook suspended from a body, and a lip projecting from the body for causing lateral to and fro oscillatory movement of the fish when the fish lure is immersed in water and moves relative to the water.

Various fish lures of this type are, at the present time, in common use.

It is an object of the present invention to provide a novel and improved fish lure of this type which is adaptable for different types of operation of selective attachment of a weight to the fish lure.

BRIEF SUMMARY OF THE INVENTION

According to the present invention, there is provided a fish lure, comprising a buoyant body; means for connecting said fish lure to a fishing line; a hook suspended from said body; a lip projecting from said body; a projection extending from said body; said projection comprising a first portion extending outwardly from said body past said lip and a second portion extending laterally from said first portion opposite from said lip; and a weight selectively attachable to and releasable from either of said first and second portions of said projection.

Depending on which of the first and second portions of the projection has a weight attached thereto, the fish lure operates in a different manner.

More particularly, when the weight is attached to the first portion of the projection, the mass of the weight causes the fish lure to be tilted downwardly, towards a side of the fish lure from which the lip projects. This mode of operation of the fish lure is preferably employed when it is desired to have the fish lure move through the water beneath the surface of the water but above the water bed.

However, when the weight is attached to the second portion of the projection, the mass of the weight causes the fish lure to become inverted. This mode of operation of the fish lure is employed when it is desired to have the fish lure rest on the water bed in an inverted condition.

The projection is preferably formed by a wire bent into a substantially triangular shape, the wire also forming an eye serving as the means for connecting the fish lure to the fishing line.

BRIEF DESCRIPTION OF THE DRAWINGS

The invention will be more readily understood from the following description of a preferred embodiment thereof given, by way of example, with reference to the accompanying drawings, in which:

FIG. 1 shows a side view of a fish lure embodying the present invention immersed in a body of water;

FIG. 2 shows a side view of the fish lure of FIG. 1 resting on the bed of the body of water;

DESCRIPTION OF PREFERRED EMBODIMENTS

Figure 4:
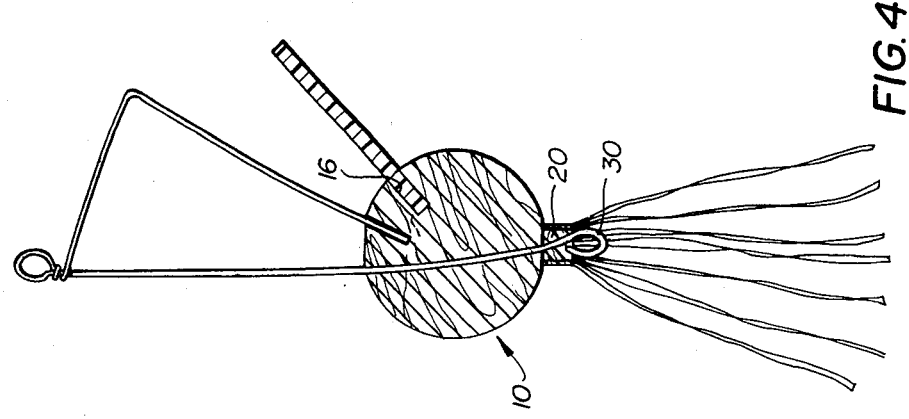
FIG. 4 shows a view taken in vertical section through the fish lure of FIGS. 1 to 3.

Referring now in greater detail to the accompanying drawings, the fish lure illustrated therein has a ball-shaped body, indicated generally by reference numeral 10, which is substantially spherical and which is made of wood or plastics material. In order to attract fish, the body 10 is preferably brightly coloured and provided with an appropriate pattern. For example, in the present embodiment, the body 10 is painted red and has a plurality of white spots 11 painted thereon.

Figure 3:
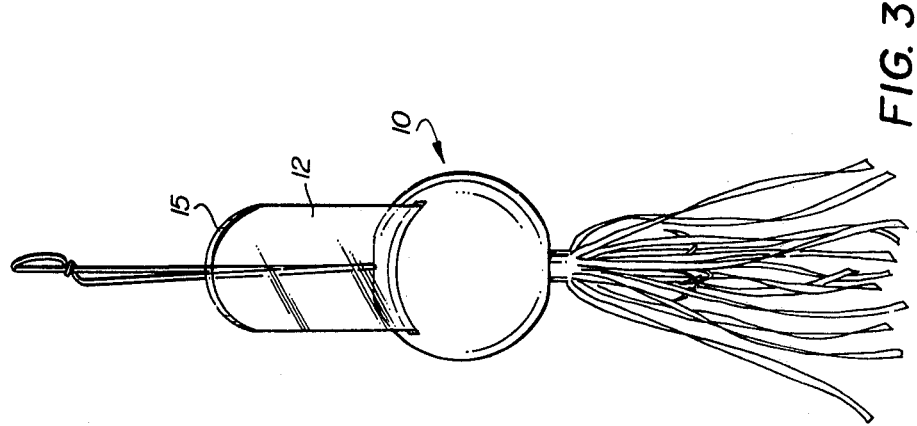
FIG. 3 shows a side elevation of the fish lure of FIGS. 1 and 2.

A lip 12 projects from one side of the body 10, the lip 12 being intended to cause the fish lure to oscillate from side to side as the fish lure is moved relative to a surrounding body of water 14, in which the fish lure is immersed. The lip 12, as can readily been seen from FIG. 3, is generally strip-shaped and flat, and has a convexly curved edge 15 at its outermost end.

The lip 12 is conveniently made of a transparent plastics material and, as shown in FIG. 4, is received in a slot 16 formed in the body 10, the innermost end of the lip 12 being secured in the slot 16 by an adhesive.

At the underside of the body 10, there is suspended a hook 18, which is surrounded by and at least partially concealed by a shirt or tail indicated generally by reference numeral 19, the main purpose of the skirt 19 being to attract fish. The skirt 19 is preferably formed of a sheet plastic material cut, over almost its entire width, into a plurality of strips, and is wrapped around a cylindrical plug 20, the plug 20 being formed in one piece with the body 10 and the skirt 19 being secured, in turn, to the plug 20 by adhesive. However, other skirts or tails of types already known in the art may be substituted for the skirt or tail 19 or indeed the lure may be made without any skirt or tail.

The fish lure is also provided with a projection formed by a wire indicated generally by reference numeral 22, which is bent to form a triangular shape and also to form an eye 23 for connection of a fishing line 24 to the fish lure.

More particularly, the triangular shape of the wire projection 22 has a first portion or side 26 which extends outwardly from the body 10 above the lip 12. As can be seen, for example, from FIGS. 1 and 2, the first side or portion 26 is substantially parallel to the lip 12, in side view.

At the outer end of the first portion or side 26, the wire is bent to provide a second portion to side 27 extending, opposite from the lip 12, laterally from the outer end of the first side or portion 26. At its left-hand end, as viewed in FIG. 1, the second side or portion 27 meets a third side or portion 28, the portion of the wire at the corner of the triangular shape where the sides 27 and 28 meet being bent to form the eye 23.

The third side or portion 28 extends from the eye 23 and the second side or portion 27 into the body 10 and, as can be seen from FIG. 4, extends into one side of the body 10 and entirely through the body 10 to the opposite thereof, where the third side or portion 28 is bent to form a second eye 30. The hook 18 is linked to and suspended and retained by the second eye 30.

The other end of the wire, i.e. the innermost end of the first side or portion 26, extends a short distance into the body 10, as can also be seen from FIG. 4, and is secured therein by an adhesive.

A weight or sinker 32 is provided for attachment to the projection 22, the weight or sinker 32 being made of lead and having a generally elongate shape formed with a longitudinal slot extending to one side thereof to enable to weight or sinkeer 32 to be slid over the wire of the projection 22 and squeezed or compressed to clamp the weight or sinker 32 onto the wire.

As is readily apparent from FIGS. 1 and 2, the weight or sinker 32 can either be attached to the first portion or side 26 of the projection 22, as shown in FIG. 1, or to the second portion or side 27, as shown in FIG. 2.

The above-described fish lure has two different modes of operation, depending on whether the weight or sinker 32 is attached to the side or portion 26 or the side or portion 27.

Thus, referring firstly to FIG. 1, when the weight or sinker 32 is attached to the first side or portion 26, the mass of the weight or sinker 32 will cause the fish lure to be tilted downwardly, until the lip 12 is pointing vertically downwardly as the lure sinks through the water after being cast.

The user of the lure can determine the depth to which the lure sinks after casting by counting. For example, experience in the use of the lure may indicate that the lure sinks at the rate of 1 foot per second, in which case if the user wishes the lure to operate at a depth of 6 feet, he can count off 6 seconds as the lure sinks and he can then begin drawing in the line. The lure will then tilt upwardly, to the position in which it is shown in FIG. 1, and remain at a depth of approximately 6 feet as it is drawn in. As the fish lure moves through the water, the lip 12 will cause it to oscillate or swing from side to side, as mentioned above.

In the second mode of operation of the fish lure, which is illustrated in FIG. 2, and in which the weight or sinker 32 is attached to the second side or portion 27 of the projection 22, the mass of the weight of sinker 32 causes the fish lure to assume an inverted condition, in which it is shown in FIG. 2. With this arrangement, the fish lure is allowed to sink to the bottom or bed 34 of the body of water 14 and is then jigged along the water bed 34 in its inverted position.

There is also a third mode of operation of the above-described fish lure, which has not been described hereinbefore, and in which the weight or sinker 32 is not attached to the fish lure. In this mode of operation, the fish lure is cast or trolled without the weight or sinker 32, and will tend to remain relatively close to the surface of the body of water 14, depending on the speed of retrieval of the fish lure.

Various modifications can be made in the above-described fish lure, as well readily be apparent to those skilled in the art. For example, it is not essential that the body 10 of the fish lure should have a ball-shaped, i.e. spherical shape, but on the contrary the fish lure may be provided with an elongate or other shape.

Also, the skirt 19 could if desired, be omitted, and the lip 12 could be formed, e.g. moulded, in one piece with the body 10.

It should be noted that the triangular projection 22, projecting over the lip 12, has the further advantage that in practice it prevents, to a considerable extent, snagging of the lure by weeds etc., especially when the lure is in the position in which it is shown in FIG. 1, since the projection 22 causes weeds running down the fishing line and meeting the projection 22 to be deflected downwardly past the lip 12.

Also, the tilting of the fish lure when used in the mode of operation illustrated in FIG. 1 causes the hook 18 to be lifted or raised at least partially behind the body 10, and this has been found to reduce the number of weeds etc., snagged by the hook 18.

When the lure is jigged in its inverted position shown in FIG. 2, the hook 18 is held above the body 10 and above the water bed 34 and is therefore less likely to snag on weeds, debris or rocks etc. on the water bed 34.

It will also be readily apparent that, instead of employing a wire bent into a triangular shape as the projection 22, other suitable means could be provided for attachment of the weight 32. For example, the projection 22 could be replaced by an L-shaped projection, which could be of wire of other material or which could be flat and, if necessary, slotted to facilitate attachment of the weight 32.

I claim:
1. A fish lure, comprising:
   a buoyant body;
   means for connecting said fish lure to a fishing line;
   a hook suspended from said body;
   a lip projecting from said body;
   a projection extending from said body;
   said projection comprising a first portion extending outwardly from said body past said lip and a second portion extending laterally from said first portion opposite from said lip; and
   a weight selectively attachable to and releasable from either of said first and second portions of said projection.
2. A fish lure as claimed in claim 1, wherein said connecting means comprise an eye on said projection.
3. A fish lure as claimed in claim 1, wherein said projection has a substantially triangular shape, said first and second portions forming two sides of the triangular shape, the third side of said triangular shape being formed by a third portion of said projection, and said third portion extending from said body to said second portion.
4. A fish lure as claimed in claim 3, wherein said connecting means comprise an eye provided at a corner of said triangular shape at which said second and third portions meet.
5. A fish lure as claimed in claim 2, wherein said projection and said eye are formed by a wire.
6. A fish lure as claimed in claim 3, wherein said projection comprises a wire formed into said triangular shape.
7. A fish lure as claimed in claim 6, wherein said third portion of said projection is formed by a length of said wire which extends through said body to the underside of said body and forms a retainer for securing said hook to said body.
8. A fish lure, comprising:
   a buoyant ball-shaped body;
   a hook suspended from said body;
   a lip projecting from said body;
   a projection extending from a side of said body opposite from said hook of said body;
   said projection comprising a wire formed into a substantially triangular shape which has a first side extending from said body past said lip, a second side extending laterally from said first side opposite from said lip and a third side extending between said body and said second side;
   an eye at the outer end of said third side for connection of a fishing line to said lure; and
   a weight readily and selectively attachable to and releasable from either of said first and second sides and having a mass which causes said lure, when immersed, to be tilted towards said one side of said body on attachment of said weight to said first side, and to be inverted on attachment of said weigh to said second side.

9. A fish lure as claimed in claim 8, further comprising a skirt around said hook.

10. A fish lure as claimed in claim 8, wherein said third side is formed by a length of said wire which extends through said body and forms a retainer for securing said hook to said body.

11. A fish lure as claimed in claim 8, wherein said lip comprises a flat strip-shaped projection having a convexly curved edge at its outermost end.

* * * * *